United States Patent Office 3,846,090
Patented Nov. 5, 1974

3,846,090
CONTROL OF LIQUID DISSEMINATION
Desmond Wilfrid John Osmond, Windsor, and Norman Douglas Patrick Smith and Frederick Andrew Waite, Farnham, England, assignors to Imperial Chemical Industries Limited, London, England
No Drawing. Filed May 12, 1972, Ser. No. 252,755
Int. Cl. C10l 1/18
U.S. Cl. 44—62
8 Claims

ABSTRACT OF THE DISCLOSURE

A liquid hydrocarbon fuel of flash point at least 90° F. having a reduced tendency to particulate dissemination on being subjected to shock, the fuel containing dissolved therein polymer of molecular weight greater than $10^6$ (viscosity average) or of intrinsic viscosity greater than 2.5 dls./gm. in a concentration such that there is molecular overlap of the polymer molecules in the liquid, the polymer being an addition homopolymer of an alkyl styrene or an addition copolymer of an alkyl styrene with one or more non-polar monomers. Preferably the alkyl group of the alkyl styrene contains from 3 to 20 carbon atoms. In preference the alkyl group contains 3 to 8, and more preferably 3 to 4, carbon atoms. A preferred alkyl styrene is tertiary butyl styrene. Desirable effects may be achieved by incorporating between 0.05 to 1% by weight of the polymer in the hydrocarbon fuel.

DISCLOSURE

This invention relates to the control of dissemination of liquids when such liquids are subjected to shock, and more particularly to improved aircraft fuels.

It is known that when a liquid with a free surface is subjected to conditions of shock there is a tendency for the liquid to become disseminated in particulate form and that the effect of shock may be such as to convert a proportion of the liquid into a dispersion of fine liquid droplets in air, i.e. a mist.

It is very desirable to be able to control the extent to which such a dispersion or mist of liquid is formed under shock conditions since, for example, this mist if inflammable may constitute a hazard. A situation in which it is most important to keep to a minimum the formation of such mist under shock conditions is the crash of an aircraft carrying inflammable liquid, such as its fuel. Though hydrocarbon fuels now used for aircraft gas turbine engines may be of a higher flash point than aviation gasoline as used in spark-ignition engines with a consequent reduction in the risk of fire due to ignition of vapour, mists of fuels with flash points of 90° F. and higher are still highly susceptible to ignition by flames, electrical sparking or the effect of friction, as well as by the presence of hot metal in the engines, and so there is still a considerable fire hazard immediately after a crash of an aircraft using such fuel. Furthermore, there is the risk of propagation of fire to the bulk of liquid fuel even if little damage is caused by ignition of the mist itself.

It is an object of this invention therefore to reduce the tendency to particulate dissemination on being subjected to shock, of a liquid hydrocarbon fuel suitable for use in gas turbine engined aircraft and having a flash point of at least 90° F.

We have now found that when such a liquid hydrocarbon fuel having a free surface is subjected to conditions of shock as herein described, the particulate dissemination of the liquid is reduced when there is dissolved in the liquid a polymer of molecular weight greater than $10^6$ (viscosity average) or of intrinsic viscosity greater than 2.5 dls./gm. in a concentration such that there is molecular overlap of the dissolved polymer.

The term "molecular overlap" describes the condition in which the segment density of the dissolved polymer in the liquid is substantially uniform on a molecular scale. This condition corresponds to concentrations at and above that at which the centres of mass of the polymer molecules are spaced, on average, at twice the radius of gyration of the polymer molecules. At lower concentrations the polymer molecules may be partially overlapped but the segment density on a molecular scale varies between a maximum value at the centre of mass of a molecule and a minimum value midway between the centres of mass and adjacent molecules.

The segment density distributions in individual polymer molecules are known or can be calculated by formula as given in "Physical Chemistry of Macromolecules," by Tanford John Wiley (1963), p. 176. Consequently the lowest concentration at which molecular overlap occurs can be calculated. Where intrinsic viscosity rather than molecular weight is known an alternative calculation can be made using the formula given in "Polymer Chemistry," by Flory Cornell (U.P. 1953), p. 611. Further, the lowest concentration at which this condition occurs may also be determined by plotting on log/log scales the apparent viscosity at zero rate of shear of polymer solutions against polymer concentration by weight. We find that such plots in the region of the concentration at which the desired molecular overlap first occurs, i.e. in the region 0.01 to 1% of polymer, consist essentially of two straight lines intersecting at the critical concentration.

By the expression "subjected to conditions of shock" we mean subjected to external forces operating for only a short time, i.e. to impulses as understood in classical applied mathematics, such that the shape of the liquid undergoes rapid deformation.

Typical conditions of shock may arise for example from:

(a) the impact of a falling or projected mass of the liquid with a rigid surface;
(b) the impingement of a solid or liquid mass on a free surface of the liquid;
(c) the application of a force to a wall of an open or vented container for the liquid such as to produce transient deformation of the container;
(d) the direct exposure of a free surface of the liquid to a rapid fluid flow, for example when a stream of the liquid is ejected into a turbulent air stream.

In these conditions of shock the liquid is subjected to a high rate of increase in rate of shear.

Liquids having a surface tension less than or not substantially greater than that of water and which have a viscosity less than 10 poises, and especially less than 1 poise, when subjected to shock conditions as defined, may produce substantial quantities of finely divided droplets from a free surface even when the shock is a little as that produced in dropping a sample, say 5 gms. of the liquid from a height of several inches onto a rigid surface. By means of this invention a reduction in dissemination of the said liquid hydrocarbon fuel may be obtained under such mild conditions of shock and under much more severe conditions.

Liquid hydrocarbon fuels suitable for use in gas turbine engined aircraft contain antioxidants such as:

(a) N,N'-diisopropyl-para-phenylenediamine
(b) N,N'-disecondary butyl-para-phenylenediamine
(c) 2,6-ditertiary butyl-4-methylphenol
(d) 2,4-dimethyl-6-tertiary butylphenol
(e) 2,6-ditertiary butylphenol
(f) 75% min. 2,6-diteriary butylphenol; 25% max. tertiary and tritertiary butylphenols (g) 72% min. 2,4-dimethyl-6-tertiary butylphenol; 28% max. monomethyl and dimethyl tertiary butylphenol (h) 65% min. N,N'-disecondary butyl-para-phenylenediamine; 35% max. N,N'-disecondary butyl-ortho-phenylenediamine.

These materials are usually present in a proportion of not more than 24 mg./litre and preferably at least 8.6 mg./litre.

The fuel may also contain:

metal deactivator such as N,N'-disalicylidene-1,2 propane diamine in amount not exceeding 5.8 mg./litre;
corrosion inhibitor. A relevant U.S. Military Specification for fuel-soluble corrosion inhibitors is MIL-I-25017;
icing inhibitor, such as ethylene glycol monomethyl ether or a mixture thereof with glycerol. A suitable proportion is from 0.10 to 0.15% by volume of the fuel. A relevant U.S. Military Specification for fuel system icing inhibitors is MIL-I-27686;
antistatic additive such as Shell Antistatic Additive ASA-3 in a concentration not exceeding 1.0 p.p.m. By use of this additive the electrical conductivity of the fuel may be brought within the range 50–300 picomhos/metre.

For use in this invention the liquid hydrocarbon fuel should have a flash point of at least 90° F. as determined by Test Method ASTM Standard D93.

Suitable liquid hydrocarbon fuels to which this invention may be applied include Aviation Turbine Fuels Grade JP–8 (flash point 110° F. min.) as specified in U.S. Military Specification MIL–T–83133, Grade JP–5 (flash point 140° F. min.) as specified in U.S. Military Specification MIL–T–5624G, Grades Jet A and Jet A–1 (flash point 110° F. min.) as specified in ASTM Specification D. 1655/66T and Grade AVTUR–NATO Code No. F–35 (flash point 100° F. min.) as specified in U.K. Ministry of Aviation Specification No. D. Eng. R.D. 2494 (Issue 4).

The nature of the polymer to be dissolved in the liquid hydrocarbon fuel which may be subjected to shock conditions is limited primarily by its molecular weight and we find that in order to influence the other characteristics of the liquid to a minimum extent and to reduce dissemination over the widest range of shock conditions the molecular weight should be greater than $10^6$ (viscosity average). In the case of hydrocarbon polymers, this lower limiting molecular weight of $10^6$ (viscosity average) corresponds to an intrinsic viscosity of 2.5 dls./gm. as determined in a hydrocarbon liquid in which the polymer is soluble at 25° C., and in the case of polymers for which the constants necessary for the calculation of viscosity average molecular weight are not readily available this value of intrinsic viscosity may be accepted as a corresponding lower limit.

In view of the requirement for high molecular weight the most suitable polymers are those prepared by addition polymerisation using free-radical, ionic, Ziegler and other types of initiators.

Since liquid hydrocarbon fuels are non-polar, polymers to be dissolved in them should also be non-polar and non-crystalline.

We have found that the most suitable polymers are the non-polar, addition, homopolymers or copolymers of an alkyl styrene. These polymers are particularly suitable in the preparation of the improved liquid hydrocarbon fuel. These polymers, in contrast to polymers obtained by a Friedel-Crafts condensation reaction, have a substantially uniform distribution of alkyl groups and hence they have improved solubility characteristics. Moreover, the use of an addition polymerisation process permits the introduction of comonomers which can be selected to modify the solvency of the final polymer.

The polymers which we find particularly useful are the non-polar homopolymers and copolymers of alkyl styrenes in which the alkyl group contains from 3 to 20 carbon atoms.

Suitable polymers are prepared by homopolymerisation or copolymerisation of, for example, n-propyl styrene, n-butyl styrene, n-amyl styrene, n-hexyl styrene and n-dodecyl styrene; sec.-dodecyl styrene; iso-propyl styrene, iso-butyl styrene, iso-amyl styrene, iso-hexyl styrene and iso-dodecyl styrene; tert-butyl styrene, tert-amyl styrene, tert-hexyl styrene and tert-dodecyl styrene.

These monomers may be copolymerised with a wide range of other non-polar monomers for example styrene, vinyl toluene, ethyl acrylate or 2-ethyl hexyl acrylate or alternatively with one or more aforementioned alkyl styrenes.

Preferably the alkyl group contains from 3 to 8 carbon atoms.

Particularly preferred polymers are the homopolymers and copolymers of $C_{3-4}$ alkyl styrenes, for example tert-butyl styrene.

The polymers may be made by conventional methods, for example using free radical or ionic initiators but one particularly suitable method is by aqueous emulsion polymerisation under conditions which provide the necessary high molecular weight. Preferably this polymerisation is carried out as low a temperature as possible in the presence of a "redox" initiator system, for example ammonium persulphate and sodium dithionite. Solution polymerisation may also be used.

Polymer particles obtained by emulsion polymerisation may be isolated and then dissolved in the liquid hydrocarbon. Alternatively the aqueous dispersion of polymer particles may be added to the fuel, the water removed and the polymer simultaneously dissolved by appropriate heating. It is clearly advantageous to prepare the polymer in such particulate form as compared with the preparation of polymer in solution. In the latter case the polymer can only be isolated in a bulk form which may be intractable and dissolve only slowly in the hydrocarbon.

The poly (alkyl styrenes) prepared by addition polymerisation have good solubility in the liquid hydrocarbon fuels such as Aviation Turbine Fuels Grade JP-8 (flash point 110° F. min.) as specified in U.S. Military Specification MIL-T-83133, Grade JP-5 (flash point 140° F. min.) as specified in U. S. Military Specification MIL-T-5624G, Grades Jet A and Jet A-1 (flash point 110° F. min.) as specified in ASTM Specification D.1655/66T and Grade AVTUR-NATO Code No. F-35 (flash point 100° F. min.) as specified in U.K. Ministry of Aviation Specification No. D. Eng. R.D. 2494 (Issue 4).

In general the solubility of the polymer in the liquid hydrocarbon fuel should be such that the theta-temperature of the system is below the temperature to which the solution is likely to be subjected, otherwise there is a danger of precipitation of the polymer. The polymer-solvent relationship at the theta-temperature is discussed by P. J. Flory in "Principles of Polymer Chemistry" at pages 612–615. In jet aircraft the lowest temperature to which the fuel is likely to be subjected is about −50° C.

It is an advantage that when the dissemination of the liquid need no longer be reduced, for example when a liquid fuel is to be sprayed into the combustion chamber of a gas turbine engine, the molecules of the polymer used in the invention may be readily reduced in molecular weight by a suitable degradation process, for example by mechanical shearing, or disentangled by shear thinning. Such treatment, leading to a decrease in control of dissemination of the liquid may be carried out in the engine itself or at an earlier stage in the feed line to the engine.

It is also an advantage that the polymers we use are inert and are used in such minor concentration that they have a minimal effect on the important characteristics of the liquid fuel, for example, the calorific value and non-gumming and non-corrosive characteristics.

The concentration of polymer dissolved in the liquid hydrocarbon fuel is broadly determined by the requirement that there should be molecular overlap of the dissolved polymer. In practice one way in which the desired minimum concentration at which this condition exists may be experimentally determined is by measuring the viscosity of a range of solutions of a polymer in the liquid over a range of shear rates. Suitable apparatus to use for this measure is a Contraves Rheomet or a Weissenburg Rheogoniometer. An apparent viscosity at zero shear rate is then obtained by arbitrarily extrapolating the values at each polymer concentration to zero shear rate, these values then being plotted against the corresponding concentration. Such plots, when on log/log scales, consist essentially of two straight line portions, the intersection of which shows up a critical region of concentration for each molecular weight in which a more rapid increase in viscosity begins to take place.

We have found that when the polymer has a molecular weight of above $10^6$ (viscosity average) or an intrinsic viscosity of greater than 2.5 dls./gm. a marked reduction in shock dissemination of the solution is obtainable at polymer concentrations as low as those in these critical regions where there is an upturn in the log/log plots of viscosity (apparent at zero shear rate) against concentration. It is known of course that shock dissemination of liquids can be reduced by drastically increasing their viscosity but the surprising result of application of this invention is that a significant reduction in shock dissemination is obtainable long before the equilibrium low shear viscosity of the solution has been raised to the high value one would expect to need to reduce shock dissemination of the solution. The resistance of the liquid to shock dissemination increases as the proportion of polymer dissolved therein increases but so does the equilibrium low shear rate viscosity of the liquid until it reaches a point where significant resistance to shock dissemination would be expected simply because this viscosity value is sufficiently high.

Using the selected polymers of this invention a marked reduction in shock dissemination of liquids can be obtained even when the solution of the polymer is a liquid by which we mean that the solution has a viscosity less than 10 poise. In preference, however, the modified fuel will have a viscosity less than 1 poise.

The proportion of polymer required in any particular case will depend on its molecular weight; the higher the molecular weight of the polymer, the lower will be the proportion of the polymer required to achieve a specified anti-misting effect. As stated above, the reduction in shock dissemination begins at concentrations corresponding to about the upturn in the log/log plot of viscosity (apparent viscosity at zero shear rate) against concentration and increases thereafter.

We have found that a useful empirical test which gives an approximate indication of the concentration at which this upturn in viscosity, resulting from molecular overlap of the polymer molecules in the solution which results in the reduction in shock dissemination of the liquid, is one in which a thin stream of the solution is dropped into the centre of a hollow cylindrical metal vessel the wall of which is lined with absorbent paper. Any splashes of liquid falling on the paper can readily be detected if a small quantity of soluble dye is added to the solution. If a 10 ml. sample of the solution is dropped in a thin stream from a height of 2 metres into such a vessel 17 cm. in diameter and 21 cm. high then the minimum polymer concentration at which no liquid splashes onto the paper lining the wall corresponds approximately to the upturn concentration on the log/log viscosity/concentration curve of the solution, i.e. the minimum concentration for molecular overlap.

This is the minimum useful anti-misting concentration of any polymer and we have found that in practice the most useful concentrations lie in the range 1.5–15 times this minimum and preferably are about 2–10 times this minimum.

As a general indication of practically useful concentration ranges, a polymer of molecular weight (viscosity average) about $10^7$ (corresponding to an intrinsic viscosity of about 10 dls./gm.) has a useful effect in aircraft fuels at a concentration of as low as 0.05% by weight whereas in the case of a polymer of viscosity average molecular weight about $10^6$ (corresponding to an intrinsic viscosity of about 2.5 dls./gm.) a concentration of about 1% by weight is desirable. Preferably, therefore, the aircraft fuels of this invention contain from 0.05–1% by weight of an appropriate polymer of molecular weight (viscosity average) at least $10^6$ or of intrinsic viscosity at least 2.5 dls./gm.

High molecular weight polymers usually are a mixture of polymers of a range of molecular weight or intrinsic viscosities, a range which is sometimes very wide. However, this invention makes use of the effect of polymers of viscosity molecular weight greater than $10^6$ or of intrinsic viscosity greater than 2.5 dls./gm. and although these selected polymers are effective and can be used in the presence of polymer of lower molecular weight or intrinsic viscosity the lower polymers cause an increase in viscosity of the liquid without the same beneficial effect on resistance to shock dissemination as the higher polymers.

When dissolving polymer in the liquid care should be taken to avoid degradation of the polymer.

The soluble polymers of this invention may, if desired, be employed in conjunction with particulate dispersions or other methods of liquid modification or gelation may be employed without losing the benefits of the invention.

The invention is illustrated by the following examples in which all proportions and percentages are by weight:

EXAMPLE 1

A mixture of 1,152 parts of demineralised water, 288 parts of acetone, 9 parts of the surfactant "Manoxol" OT (a commercially available sodium dioctyl sulphosuccinate; "Manoxol" is a registered trademark) and 360 parts of tertiary butyl styrene was stirred under nitrogen at 25° C. When the surfactant had dissolved, a two-component addition polymerisation initiator consisting of (a) a solution of 0.18 parts of ammonium persulphate in 8 parts of demineralised water, and (b) a solution of 0.312 parts of sodium dithionite in 8 parts of demineralised water was freshly prepared and introduced rapidly into the mixture. A slow exothermic reaction was observed after about ½ hour and allowed to continue for 6–8 hours the reaction temperature reaching a peak of 35° C. during this time.

The product was a dispersion of poly(tertiary-butyl styrene) which had a solids content of 18–20% by weight and the average particle diameter of the dispersion was 0.1 microns. The polymer had a molecular weight (viscosity average) of $20 \times 10^6$ and an intrinsic viscosity of 8 dls./gm.

A 2% solution of poly(tertiary-butyl styrene) in a typical aviation fuel, AVTUR 50 (Defence Specification D. Eng. RD 2494) was prepared by stirring the appropriate proportion of the above dispersion and AVTUR 50 at 150° C. and removing the water by azeotropic distillation.

A series of solutions of the polymer ranging from 0.05 to 1% polymer concentration was prepared by dilution of the 2% solution with further AVTUR 50. These solutions were subjected to the "splash test" described in our British patent application No. 60,720/68 in which there is observed the pattern of liquid splashes produced by allowing the modified fuel (coloured by addition of a dyestuff) to fall into a hollow cylindrical vessel lined with absorbent paper. At 0.1% polymer concentration there was a spatter pattern of medium size spots and low frequency and at 0.2% polymer concentration there was complete absence of spatter.

The solutions were also tested for their resistance to misting and ignition in aircraft crash conditions by the following test method.

The test apparatus consists of a propulsion unit capable of accelerating a small trolley guided along a track to a speed of approximately 120 feet/sec. The trolley is coupled to a braking system which is capable of stopping the trolley at a mean deceleration of 30 times the acceleration of gravity. A fuel tank is attached to the trolley and at the forward end of the fuel tank is an orifice which is closed with a weighted rubber bung. Approximately 45 mls. of the fuel to be tested are placed in the tank and the trolley is winched back to a release point from which it is released and accelerated up to a speed of 120 feet/sec. The acceleration takes place along about 10 feet of the track and the trolley is then decelerated along about 10 feet of the track by the braking system so that the weighted bung is ejected and the fuel is expelled through the tank orifice.

There is an ignition array of small gas flames spaced linearly at one foot intervals beneath the portion of the track over which deceleration takes place and beyond the track.

When unmodified AVTUR fuel is subjected to the test it produces a flare above the ignition array of 6–7 feet in length and of large volume. On the other hand, when modified AVTUR fuel according to this Example was subjected to the same conditions, 0.2–0.3% polymer concentration was effective in preventing any substantial ignition of the fuel.

EXAMPLES 2–7

Dispersions of further polymeric additives were prepared by methods similar to that described in Example 1, i.e. by addition polymerisation. The dispersion in each case had a solids content in the range 15–25% by weight and the particle size in each dispersion was of the order of 0.1 microns.

A 2% solution of each polymer in a typical aviation fuel, AVTUR 50 (Defence Specification D. Eng. RD 2494) was prepared by stirring the appropriate proportion of the above dispersion and AVTUR 50 at 150° C. and removing the water by azeotropic distillation.

A series of solutions of each polymer ranging from 0.1 to 1% polymer concentration was prepared by dilution of the 2% solution with further AVTUR 50.

Each sample was tested for its resistance to misting and ignition using the simulated aircraft crash test described in Example 1.

The following table sets out details of each of the polymers (copolymers) tested and the concentration of each required to completely suppress mist and prevent ignition.

| Ex. No. | Polymer or copolymer | Monomer ratio by weight | Intrinsic viscosity in AVTUR 50 at 25 deg. C. (dls./gm.) | Concentration percent by weight[1] |
|---|---|---|---|---|
| 2 | Tertiary butyl styrene | 100 | 6 | 0.3 |
| 3 | Tertiary butyl styrene: styrene. | 90:10 | 5 | 1.0 |
| 4 | Tertiary butyl styrene: ethyl acrylate. | 70:30 | 8 | 0.4 |
| 5 | Tertiary butyl styrene: vinyl toluene. | 80:20 | 5.5 | 0.8 |
| 6 | Tertiary butyl styrene: 2-ethyl hexyl acrylate. | 60:40 | 8 | 0.2 |
| 7 | Tertiary butyl styrene: 2-ethyl hexyl acrylate: ethyl acrylate. | 60:20:20 | 7 | 0.5 |

[1] Required for complete suppression of mist and ignition.

Whilst all of the above Examples are concerned with tetiary butyl styrene or copolymers thereof, it should be understood that other alkyl styrenes, particularly those in which each alkyl group contains between 3 and 20 carbon atoms, are equally useful in the present invention.

We claim:

1. A liquid hydrocarbon fuel of flash point at least 90° F. and suitable for use in gas turbined engined aircraft, having a reduced tendency to particulate dissemination on being subjected to shock the fuel containing dissolved therein polymer of molecular weight greater than $10^6$ (viscosity average) or of intrinsic viscosity greater than 2.5 dls./gm. in a concentration such that there is molecular overlap of the polymer molecules in the liquid the polymer being an addition homopolymer of an alkyl styrene or an addition copolymer of an alkyl styrene with one or more ethylenically unsaturated non-polar monomers copolymerizable with said alkyl styrene.

2. A liquid hydrocarbon fuel as claimed in claim 1 in which the polymer is a non-polar, addition, homopolymer or copolymer of an alkyl styrene wherein the alkyl group contains from 3 to 20 carbon atoms.

3. A liquid hydrocarbon fuel as claimed in claim 1 in which the polymer is a non-polar, addition, homopolymer or copolymer of an alkyl styrene wherein the alkyl group contains from 3 to 8 carbon atoms.

4. A liquid hydrocarbon fuel as claimed in claim 1 in which the polymer is a non-polar, addition, homopolymer or copolymer of an alkyl styrene wherein the alkyl group contains from 3 to 4 carbon atoms.

5. A liquid sydrocarbon fuel as claimed in claim 1 in which the alkyl styrene is tertiary butyl styrene.

6. A liquid hydrocarbon fuel as claimed in claim 1, the fuel containing between 0.05 and 1% by weight of the polymer.

7. A liquid hydrocarbon fuel as claimed in claim 1, the fuel having a viscosity less than 10 poise.

8. A liquid hydrocarbon fuel as claimed in claim 1, the fuel having a viscosity less than 1 poise.

References Cited

UNITED STATES PATENTS

| 3,136,743 | 6/1964 | Conway et al. | 252—56 R |
| 3,231,498 | 1/1966 | deVries | 44—62 |
| 3,326,804 | 1/1967 | Shih-en Hu | 44—62 |
| 3,473,901 | 8/1969 | de Benneville et al. | 44—62 |

OTHER REFERENCES

Kirk-Othmer, Encyclopedia of Chemical Technology, 2nd ed., vol. 15, 1968, p. 87.

Tanford, Physical Chemistry of Macromolecules, Wiley 1961, pp. 165–168, 174–178, 198–200, 402–406.

Miller, The Structure of Polymers, Reinhold, 1966, pp. 190–193, 213, 214.

Porter et al., "The Entanglement Concept in Polymer Systems," in Chemical Reviews, vol. 66, No. 1, 1966, pp. 1–4, 13.

Cohen et al., Journal of Polymer Science, vol. 49, 1961, pp. 377–383.

Flory, Principles of Polymer Chemistry, Cornell U., 1953, pp. 610–611.

DANIEL E. WYMAN, Primary Examiner

Y. H. SMITH, Assistant Examiner

U.S. Cl. X.R.

44—80